(12) United States Patent
Hikmet et al.

(10) Patent No.: US 6,366,335 B1
(45) Date of Patent: *Apr. 2, 2002

(54) POLARIZATION-SENSITIVE BEAM SPLITTER, METHOD OF MANUFACTURING SUCH A BEAM SPLITTER AND MAGNETO-OPTICAL SCANNING DEVICE INCLUDING SUCH A BEAM SPLITTER

(75) Inventors: Rifat A. M. Hikmet; Willem G. Ophey; Josephus J. M. Braat, all of Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/080,891

(22) Filed: Jun. 22, 1993

Related U.S. Application Data

(63) Continuation-in-part of application No. 08/074,179, filed on Jun. 9, 1993.

(51) Int. Cl.$^7$ ............................. G02F 1/13; G02B 5/30; G11C 19/08
(52) U.S. Cl. ........................... 349/193; 349/1; 349/183; 349/187; 359/496; 359/640; 369/44.12; 369/106
(58) Field of Search ................................. 359/495, 496, 359/497, 500, 37, 94, 601, 831; 369/44.11, 114, 44.12, 106; 349/113, 183, 187

(56) References Cited

U.S. PATENT DOCUMENTS

| | | | | |
|---|---|---|---|---|
| 3,623,795 A | * | 11/1971 | Taylor | 349/1 |
| 4,446,305 A | * | 5/1984 | Rogers et al. | 528/348 |
| 4,525,413 A | * | 6/1985 | Rogers et al. | 359/500 |
| 4,787,710 A | * | 11/1988 | Durell | 359/834 |
| 4,810,433 A | * | 3/1989 | Takayangi et al. | 264/1.34 |
| 4,820,031 A | * | 4/1989 | Kastendeck et al. | 359/833 |
| 4,822,149 A | * | 4/1989 | Kubick | 359/315 |
| 4,822,151 A | * | 4/1989 | Tatsuno et al. | 356/365 |
| 4,868,261 A | * | 9/1989 | Kobayashi et al. | 359/831 |
| 4,951,274 A | * | 8/1990 | Iwanaga et al. | 369/44.11 |
| 5,289,313 A | * | 2/1994 | Matsuoko | 359/496 |
| 5,363,126 A | * | 11/1994 | Andrews | 346/108 |

OTHER PUBLICATIONS

"Liquid Crystal Wedge as a Polarizing Element and It's Use in Shearing Intesferometry", Murty et al, OPT. Eng. Jan.–Feb. 1980, vol. 19 No. 1, pp. 113–115.*

R.A.M. Hikmet & D.J. Broer, "Dynamic mechanical properties of anisotropic networks formed by liquid crystalline acrylates", Polymer 1991, vol. 32, No. 9, pp. 1627–1630.

Von Richard Sietmann, "Der optische Ather im Vormarsch", Funkschau 18/1991, pp. 79–85. (EnglishPortions).

* cited by examiner

Primary Examiner—Kenneth Parker
(74) Attorney, Agent, or Firm—Norman N. Spain

(57) ABSTRACT

A polarization-sensitive beam splitter comprising at least one transparent wedge-shaped element of a birefringent material is made by providing each one of two substrate plates with an orientation layer, whereafter the substrate plates are arranged with their orientation layers facing each other while forming a wedge-shaped interspace. The interspace is filled with a liquid crystalline monomer composition, which is subsequently cured while forming a wedge-shaped element of a uniaxially oriented polymer material. After possible removal of the substrate plates, two or three of such wedge-shaped elements can be joined to a Wollaston prism for use in the pick-up element of a magneto-optical recording system.

11 Claims, 6 Drawing Sheets

POLARIZATION-SENSITIVE BEAM SPLITTER, METHOD OF MANUFACTURING SUCH A BEAM SPLITTER AND MAGNETO-OPTICAL SCANNING DEVICE INCLUDING SUCH A BEAM SPLITTER

RELATED APPLICATIONS

The instant application is a continuation-in-part of an application Ser. No. 08/074,179 filed Jun. 9, 1993, Attorney's Docket No. PHN 14332.

BACKGROUND OF THE INVENTION

The invention relates to a polarization-sensitive beam splitter comprising at least one transparent wedge-shaped element of a birefringent material, and to a device for scanning a magneto-optical record carrier including such a beam splitter.

The invention also relates to a method of manufacturing a polarization-sensitive beam splitter comprising at least one transparent wedge-shaped element of a birefringent material, and to a device for scanning a magneto-optical record carrier.

SUMMARY OF THE INVENTION

A polarization-sensitive beam splitter of this type is described in United States Patent U.S. Pat. No. 4,951,274 for use in a pick-up element of a magneto-optical recording system. In this beam splitter two transparent wedge-shaped elements are used which are formed from crystalline quartz and are secured to each other in such a way that the optical axes of the elements mutually extend at an angle between 45° and 135°. Such a beam splitter (Wollaston prism) proportionally occupies much space in the pick-up element of a magneto-optical recording system. Moreover, the quartz elements must be accurately processed and correctly shaped.

It is, inter alia an object of the invention to provide a polarization-sensitive beam splitter which is small and lightweight. The invention has for its object to provide a beam splitter which can be simply and accurately positioned in a light path in the desired manner. It is desirable to provide a beam splitter in which in transmission the orthogonally polarized light components are separated from each other, whereafter the polarized light beams mutually diverge. The invention has also for its object to provide a simple method of manufacturing such a polarization-sensitive beam splitter.

These and other objects are achieved by a polarization-sensitive beam splitter as described in the opening paragraph, which beam splitter according to the invention is characterized in that the wedge-shaped element comprises a uniaxially oriented polymer material which is formed from a cured liquid crystalline monomer composition.

In accordance with a very suitable embodiment of the polarization-sensitive beam splitter according to the invention, this beam splitter comprises two or three wedge-shaped elements having mutually different directions of orientation of the polymer materials.

A special embodiment of the beam splitter according to the invention comprises an anti-reflection grating, provided in the polymer material, on the faces of the beam splitter where the light beam enters and exits, respectively.

A device for scanning a magneto-optical record carrier according to the invention includes a beam splitter comprising a wedge-shaped element which is formed from a uniaxially oriented polymer material. The light path of the device can be made very compact due to the small dimensions of such a beam splitter.

To obtain a beam splitter having a small total thickness, it is possible to juxtapose a plurality of small wedge-shaped elements in a sawtooth structure. Also in that case pairs of two wedge-shaped elements each, with mutually different directions of orientation of the polymer materials, can be used.

According to the invention, the object of providing a method of manufacturing a polarization-sensitive beam splitter is achieved by means of a method in which two substrate plates are provided with orientation layers, whereafter the substrate plates are arranged with their orientation layers facing each other while forming a wedge-shaped interspace, whereafter the interspace is filled with a liquid crystalline monomer composition which is subsequently cured while forming a wedge-shaped element.

Subsequently, the substrate plates may be removed, if desired. If one substrate plate or both substrate plates are not removed, for example, because they are used as protections at the outer side of the beam splitter, a substrate plate having a thickness of between 0.1 and 1 mm is preferably used.

It is true that U.S. Pat. No. 5,042,925 describes a polarization-sensitive beam splitter with a polarizing layer comprising a cured liquid crystalline monomer composition, but this polarizing layer is not wedge-shaped. The known beam splitter is proportionally large and partly operates in transmission and partly in reflection. An accurate position and orientation in the light path is critical for a satisfactory operation of the known beam splitter.

DETAILED DESCRIPTION OF THE INVENTION

Figure 1:
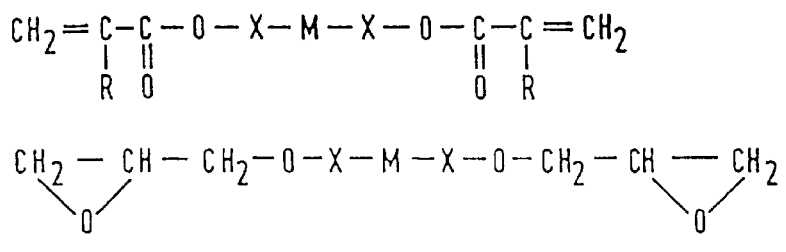
FIG. 1 shows suitable monomers for forming a wedge-shaped element according to the invention.
Figure 1:
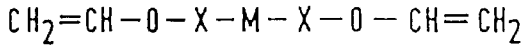
Figure 1:
Figure 1:
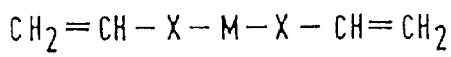

The invention will now be described in greater detail with reference to the figures of the drawing and the following embodiments.

Figure 2:
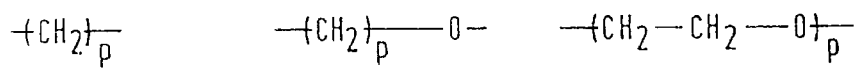
FIG. 2 shows examples of the group X.
Figure 2:
Figure 2:
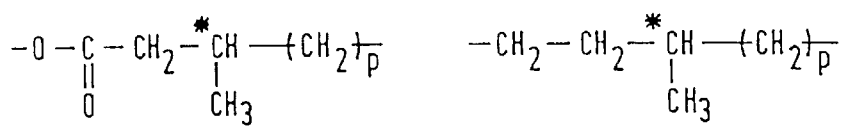
Figure 3:
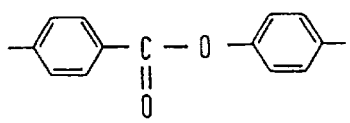
FIG. 3 shows examples of the group M.
Figure 3:
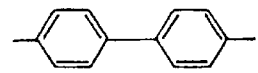
Figure 3:
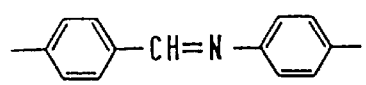
Figure 3:
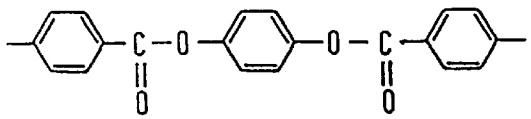

FIG. 1 shows a plurality of suitable monomers with which a wedge-shaped element can be manufactured for use in a polarization-sensitive beam splitter according to the invention. Suitable monomers are, inter alia, acrylate compounds (the group —R is a hydrogen atom), methacrylate compounds (the group —R) is a methyl group), chloroacrylate and fluoroacrylate compounds (the group —R is a chlorine atom or fluorine atom), epoxy compounds and vinyl ether compounds. Examples of the group —X— are shown in FIG. 2, in which p may have a value from 1 to approximately 12. Examples of the group —M— are shown in FIG. 3. For curing the monomer composition by means of photopolymerization, a photosensitive initiator can be used whose nature can be adapted in known manner to the nature of the monomer. Aromatic carbonyl compounds are suitable photosensitive initiators for curing di(meth)acrylate compounds, while diaryliodonium compounds such as diphenyliodonium hexafluoroarsenide can be used for curing epoxy and vinyl ether compounds.

Embodiment 1

Figure 4:
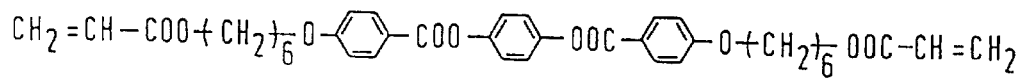
FIG. 4 shows the structural formula of a suitable liquid crystalline monomer composition.

A monomer composition was made by mixing a liquid crystalline diacrylate compound, whose structural formula is shown in FIG. 4 (for example, to be manufactured by means of the method described in European Patent Application no. EP 261 712) with 2% by weight of the photosensitive initiator 2,2 dimethoxy-2-phenyl-acetophenone (marketed by the firm of Ciba-Geigy).

Two rectangular glass plates were coated with orientation layers of nylon and rubbed with an anti-fluff cloth in one direction which was chosen to be parallel to one of the edges of each glass plate. The glass plates were subsequently arranged opposite each other, with their rubbing directions in parallel, while leaving a wedge-shaped space between the glass plates. A spacer was placed between the glass plates at one of the sides so that the angle between the glass plates, the wedge angle, was 4°. The space between the glass plates was filled up with the afore-described monomer composition whereafter a solid wedge-shaped element was formed by curing by means of actinic radiation, specifically in this example by irradiation by UV light in accordance with the example, whereafter the glass plates were removed.

Figure 5:
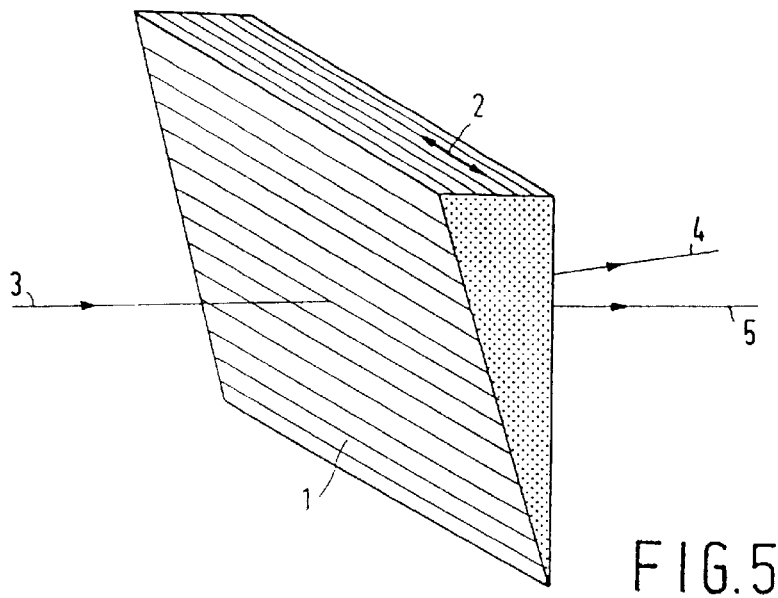
FIG. 5 shows a wedge-shaped element for use in a polarization-sensitive beam splitter.

FIG. 5 shows the resultant wedge-shaped element 1 in which the direction 2 of orientation of the molecules is chosen to be perpendicular to the optical axis of the element and parallel to the narrow edge of the wedge. An incident unpolarized light beam 3 is separated into an extraordinary light beam 4 and an ordinary light beam 5 having mutually different directions of polarization. The value of the angle between the two exiting beams is proportional to the wedge angle and to the value of the birefringence. Due to the relatively large birefringence of the polymer materials used, a relatively small wedge angle can be employed for forming a given angle between the exiting beams. For a beam splitter of, for example crystalline quartz, which has a considerably smaller birefringence than the polymer materials, the wedge angle should be approximately fifteen times as large to form the same angle between the exiting beams. Since the wedge angle is decisive for the thickness of the beam splitter, it will be evident that the beam splitter according to the invention can be made considerably thinner than quartz beam splitters.

Instead of orientation layers of nylon, other known orientation layers may be used such as rubbed layers of polyimide or polyethylene, or a silicon oxide layer sputtered at an angle. If desired, the orientation may alternatively be obtained by applying a magnetic field, for example of a strength of 15 kGauss.

Suitable materials and alternative methods which may be used for manufacturing a polarization-sensitive beam splitter according to the invention are also described in an article by R. A. M. Hikmet and D. J. Broer in Polymer 32 (9), pp. 1627–1632 (1991). This article describes the manufacture of self-supporting flat elements suitable for dynamic mechanical measurements.

Embodiment 2

Two wedge-shaped elements as described in embodiment 1 were manufactured, but the rubbing direction in one element, and hence the direction of orientation of the molecules was chosen to be such that it extended at an angle of 45° to the narrow edge of the wedge.

Figure 6:
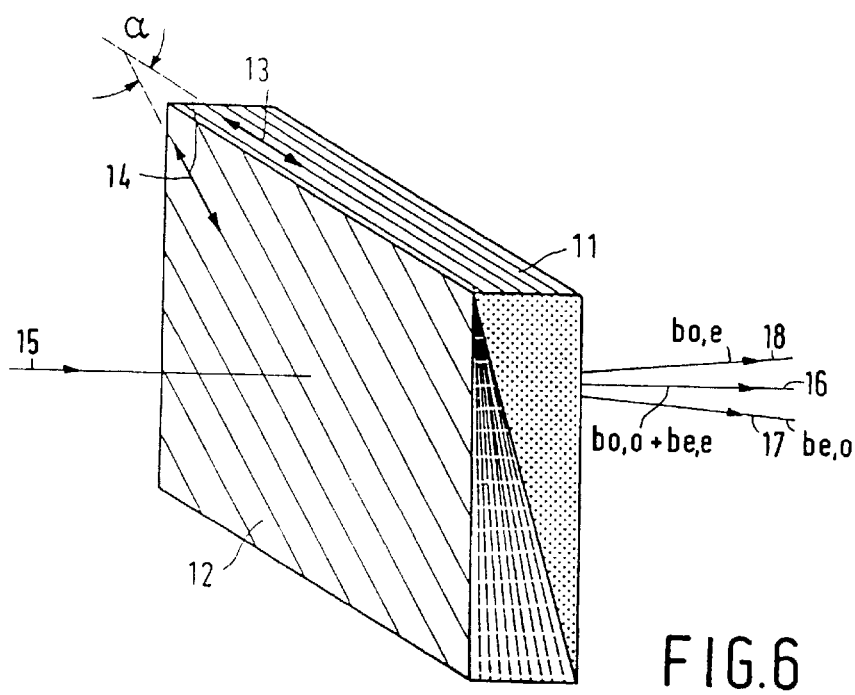
FIGS. 6 and 7 show two different embodiments of a polarization-sensitive beam splitter comprising two wedge-shaped elements.

FIG. 6 shows a polarization-sensitive beam splitter comprising two wedge-shaped elements 11 and 12 in which the directions 13 and 14 of orientation are perpendicular to the optical axis of the beam splitter and extend at an angle of 45° to each other.

In principle, such a double beam splitter, which may be referred to as a modified Wollaston prism, splits an incident unpolarized light beam 15 into four sub-beams, two of which, $b_{o,o}$ and $b_{e,e}$, coincide while the two other sub-beams, $b_{e,o}$ and $b_{o,e}$ extend at an opposite angle thereto. The first and the second index of these sub-beams indicate that the relevant sub-beam for the first and the second wedge-shaped element is an ordinary (o) or an extraordinary (e) beam, respectively. For the sake of simplicity the unpolarized on-going beam, formed by the sub-beams $b_{o,o}$ and $b_{e,e}$ is denoted by 16 and the deflected, mutually perpendicularly polarized sub-beams $b_{e,o}$ and $b_{o,e}$ are denoted by 17 and 18, respectively. Such a beam splitter may be used to great advantage in a scanning device for a magneto-optical record carrier.

The ratio between the power of the on-going beam 16 and the sum of the powers of the deflected beams 17 and 18 is dependent on the angle between the directions 13 and 14 of orientation. At an angle of 0° the ratio is infinite, i.e. only the on-going beam 16 is present. At an angle of 45° the ratio is 1. At an angle of 90° the ratio is zero, i.e. the on-going beam 16 is absent and the beam splitter functions as a non-modified Wollaston prism. If the incident beam 15 is polarized, the ratio of the powers in the three beams is also dependent on the state of polarization of the incident beam. While the manufacture of, for example a quartz beam splitter at an angle which is unequal to 45° or 90° yields great cutting losses, the manufacture of such a beam splitter of a polymer material is essentially equal to the manufacture of the beam splitter shown in FIG. 6, in which one of the rubbing directions should be chosen to be different.

Embodiment 3

Two wedge-shaped elements as described in embodiment 1 were manufactured, but the rubbing direction in one element, and hence the direction of orientation of the molecules was chosen to be such that it extended at an angle of 90° to the narrow edge of the wedge. The wedge-shaped elements were secured together by means of an optically neutral glue.

Figure 7:
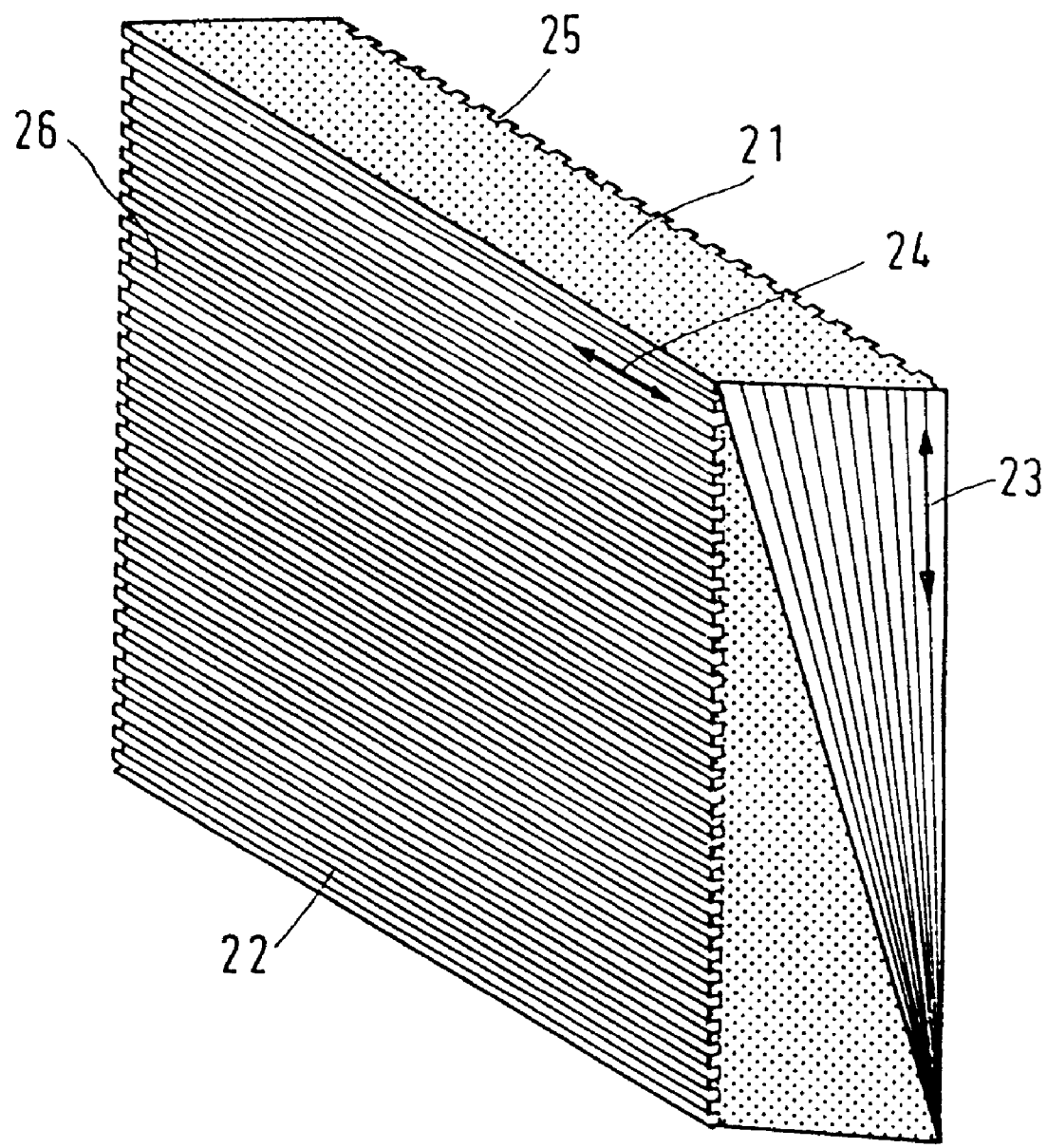

FIG. 7 shows a polarization-sensitive beam splitter comprising two wedge-shaped elements 21 and 22 in which the directions 23 and 24 of orientation are perpendicular to the optical axis and to each other. If desired, this beam splitter (Wollaston prism) may be provided with anti-reflection grating layers 25 and 26 by using glass plates having a desired grating which is replicated on the entrance surface and the exit surface of the beam splitter, i.e. on the surface where the beam enters the beam splitter and where it leaves the beam splitter. The grating contributes to giving a direction of orientation to the molecules of the liquid crystalline monomer composition and the birefringent polymer obtained by curing. For a light wavelength of 800 nm a suitable grating is formed by ridges having a height of 0.2 µm and a period of 0.48 µm. If it is desired to give the beam splitter a very smooth surface, this can be realised, for example by providing a thin glass layer.

Embodiment 4

Figure 8:
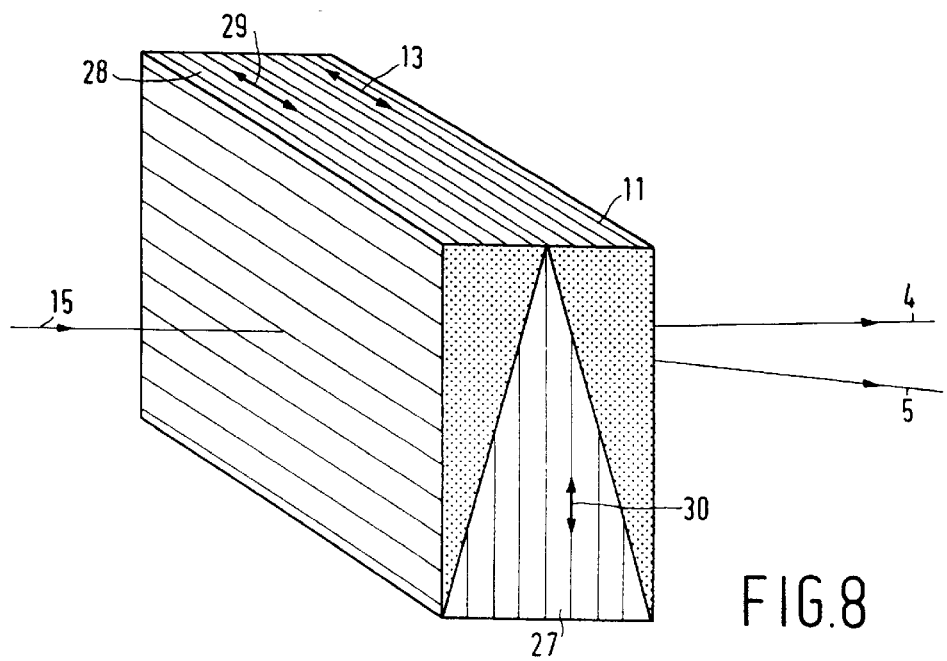
FIG. 8 shows an embodiment of a polarization-sensitive beam splitter comprising three wedge-shaped elements.

Three wedge-shaped elements as described in embodiment 1 can be manufactured, in which the wedge angles of the first element 28 and the third element 11 are equal and the wedge angle of the second element 27 is twice as large as the wedge angle of the first element, which three elements are subsequently combined to a beam splitter as is shown in FIG. 8. The rubbing directions 29 and 13 of the first and third elements, respectively, are equal, whereas the rubbing direction 30 of the second element extends at an angle of 90° to the rubbing direction 13. Due to its symmetrical structure, such a prism referred to as double Wollaston only leads to a small perturbation of the wavefront of the transmitted light beams 4 and 5. The angle of 90° between the rubbing directions 13 and 30 leads to a split-up of an incident, unpolarized beam 15 into two polarized beams 4 and 5. By taking a different angle between 0° and 90° instead of an angle of 90°, the incident beam is split up into two polarized beams and one unpolarized beam, in accordance with the split-up by the Wollaston prism shown in FIG. 6. A double Wollaston made of quartz is unsuitably large for many applications. However, a double Wollaston of polymer material may be made in a very small size.

The polarization-sensitive beam splitter according to the invention is small and lightweight. It is easy to provide it in an optical device and particularly its positioning in a light path is easy because notably the orientation (angle to the light beam or optical axis) is not very critical and the optical properties are defined by the choice of the angle between the glass plates during manufacture of the wedge-shaped elements.

Figure 9:
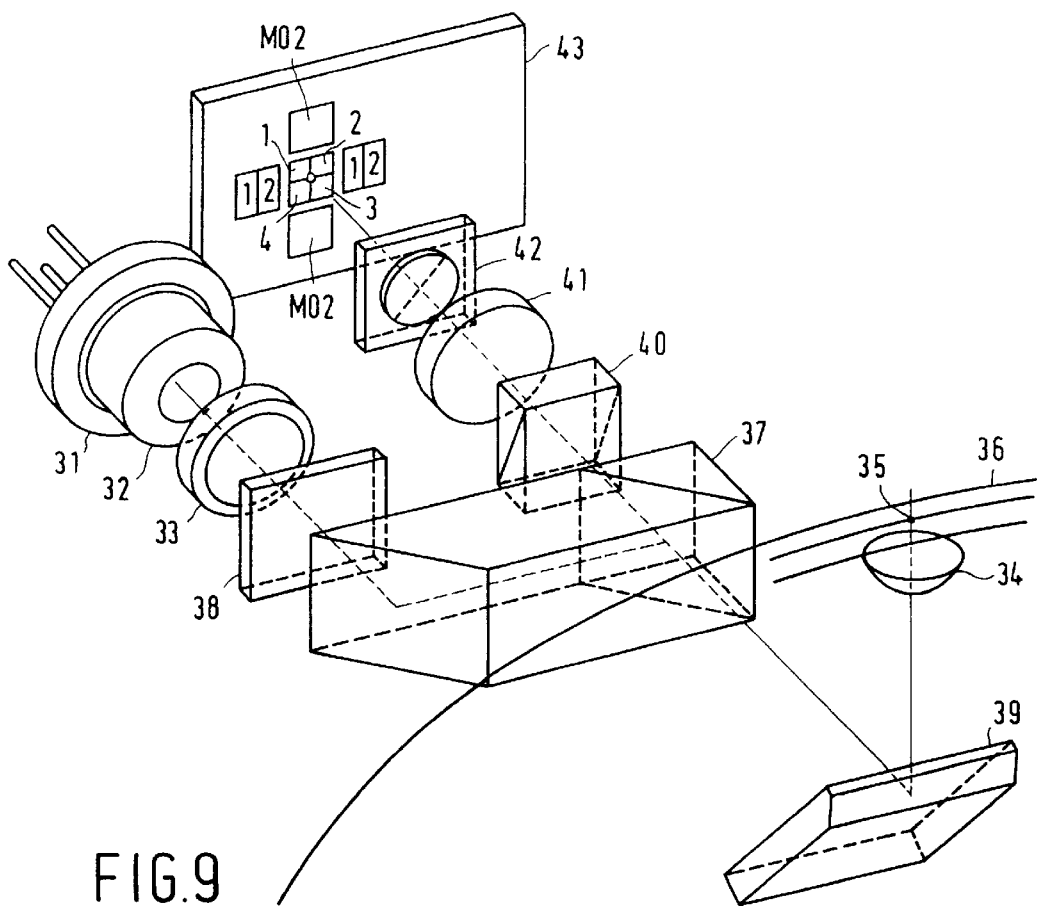
FIG. 9 shows a device for scanning a magneto-optical record carrier.

FIG. 9 shows an embodiment of a device for scanning a magneto-optical record carrier according to the invention. This device comprises a light source 31 in the form of a semiconductor laser for supplying a scanning beam 32. A lens system for focusing the scanning beam generated by the light source is arranged in the path of the scanning beam. This system comprises a collimator lens 33 and an objective system 34 for focusing the scanning beam to form a scanning spot 35 on an information plane 36 of the record carrier. A partially polarizing beam splitter 37 (PPBS) is arranged in the light path. The construction and function of this PPBS is described in, for example European Patent Specification number 0 078 673. The device preferably also comprises a grating 38 for splitting the beam 32 into, for example three sub-beams for a tracking servo system and, if desired, a mirror 39 for folding the light path.

The scanning beam is reflected in the record carrier and guided towards the PPBS via the objective system and the mirror 39 which may be present. The light passed by the PPBS is subsequently split by a polarization-sensitive beam splitter 40 into an on-going beam and two deflected, mutually perpendicularly polarized beams, as is shown in FIG. 6. According to the invention this beam splitter comprises two wedge-shaped elements of a birefringent material, i.e. a uniaxially oriented polymer which is formed from a cured liquid crystalline monomer composition in which the direction of orientation of the two wedge-shaped elements is different. The beams formed by the beam splitter are subsequently passed through a lens 41 and possibly through a cylindrical lens 42, whereafter they are incident on a detector system 43.

The beam splitter 40 may be relatively thin due to the small required wedge angle. At a beam diameter of 5 mm a thickness of less than 0.5 mm of the beam splitter is already sufficient for a satisfactory separation of the exiting beams. Such a thin beam splitter may be simply secured to the beam splitter 37 so that the number of components in the light path is reduced. A further reduction can be realised by providing the grating 38 also on the beam splitter 37 by means of a replica technique.

The on-going beam formed by the beam splitter 40 may be used for generating servo signals with which the scanning spot is held at the correct position in the record carrier, while the two deflected, mutually perpendicularly polarized beams are used to generate an information signal which represents the information stored in the information plane 36. The distribution of the light power from the record carrier over the two polarized beams on the one hand and the on-going beam on the other hand can be adapted to the bandwidths of the information signal and the servo signals. Generally, the power in the beam should be larger as the bandwidth is larger. The ratio between the power in the polarized beams and that in the on-going beam is adjusted by means of the angle α between the directions 13, 14 of orientation in FIG. 6; 23, 24 in FIG. 7 in the wedge-shaped parts of the beam splitter 40. The angle is preferably larger than 45° so as to have sufficient light available in the deflected polarized beams for generating the wideband information signal. The invention provides the possibility of giving the angle between the directions of orientation any arbitrary value between 0° and 90°. The choice of the angle is determined by the circumstances in which the beam splitter must be used.

Figure 10:
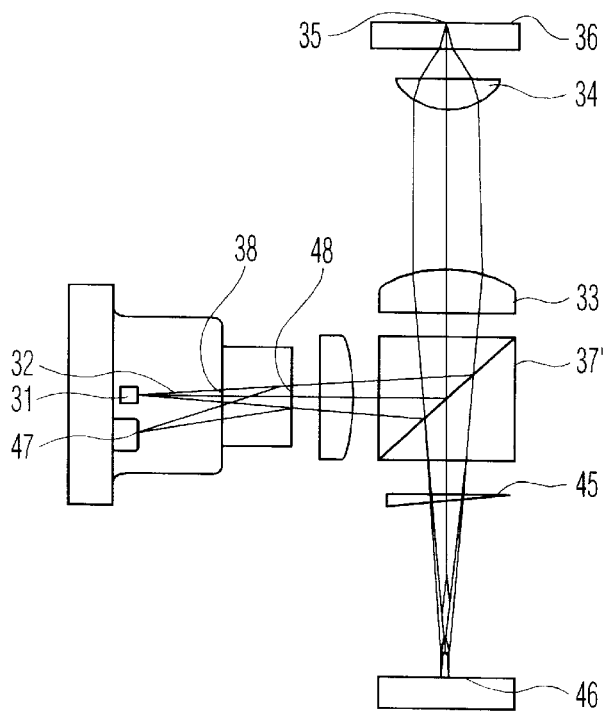
FIG. 10 shows a device for scanning a magneto-optical record carrier, FIGS. 11a and b show two orientations of the beam splitter and detection system of the device of FIG. 10, FIGS. 12a and b show two embodiments of an integrated PPBS cube and wedge element.

FIG. 10 shows another embodiment of a device for scanning a magneto-optical record carrier according to the invention. The embodiment uses a polarization-sensitive beam splitter 45 comprising one wedge-shaped element of birefringent material according to the invention, whereas the embodiment of FIG. 9 uses a beam splitter comprising two wedges. The device has two detection systems. One detection system 46 is placed in the path of the beams passing through the beam splitter 45 and is used for generating the information signal. The other detection system 47 is placed in a beam returning from the record carrier and deflected by means of a coupling grating 48, and is used for generating servo signals.

Figure 11A:
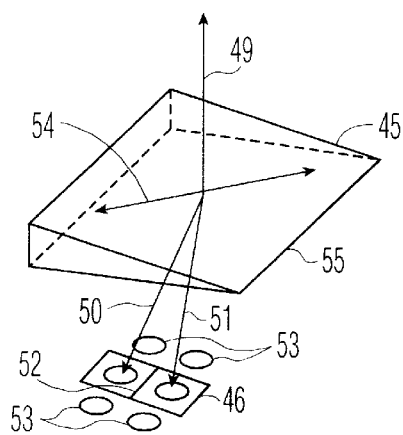

FIG. 11a shows a perspective view of the beamsplitter 45 and the detection system 46. The beam splitter splits the incoming beam 49 in two outgoing beams 50 and 51, each of which is incident on a side of a dividing line 52 between the two halves of the split detection system. The four spots 53 alongside the detection system are due to the beams generated by the three-beam grating 38. The required orientation and polarization of the outgoing beams 50 and 51 are achieved by giving the direction of orientation 54 of the wedge of the beam splitter an angle of 45° with the line of intersection 55 of the two planes forming the wedge.

Figure 11B:
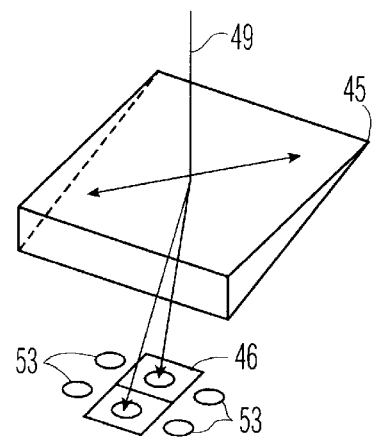

An alternative orientation of the beam splitter and the detection system is shown in FIG. 11b.

Figure 12A:
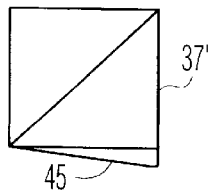
FIG. 12c shows an embodiment of an integrated PPBS plate and wedge element.
Figure 12B:
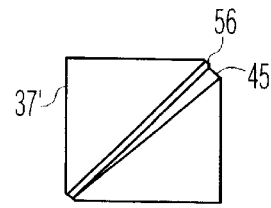
Figure 12C:
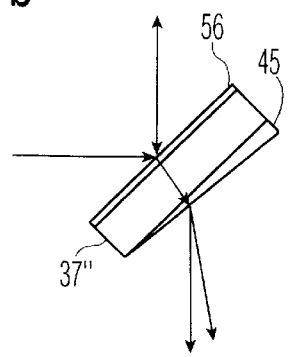

The PPBS 37' and the beam splitter wedge 45 in the device of FIG. 10 may be integrated in one unit to make the device more compact. FIG. 12a shows a unit where the wedge 45 is optically connected to a face of the cube forming the PPBS 37'. The wedge can also be arranged on the hypotenuse plane of the cube, in contact with the PPBS coating 56, as shown in FIG. 12b. In case the PPBS is in the form of a plane parallel plate 37", as shown in FIG. 12c, the PPBS coating 56 may be arranged on one side of the plate, whereas the wedge 45 is arranged on the other side of the plate.

Figure 13A:
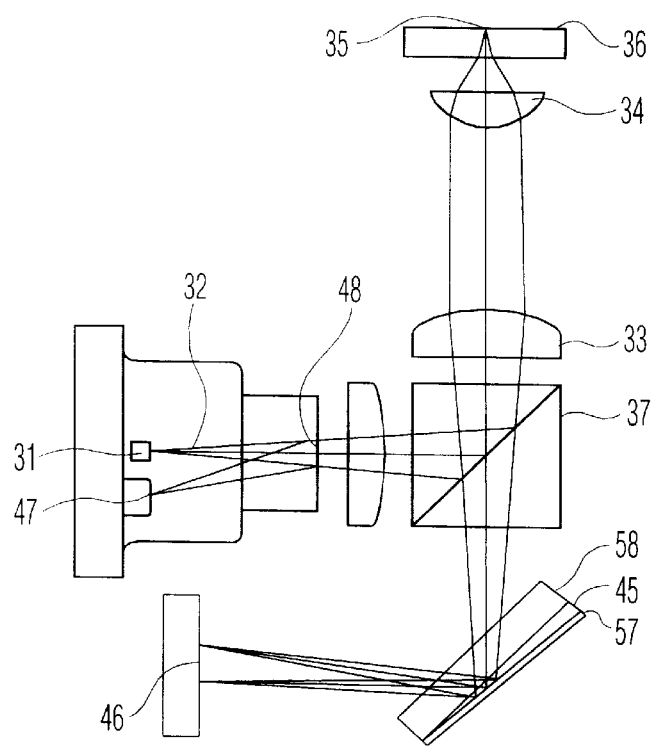
FIG. 13a shows a device for scanning a magneto-optical record carrier, and FIGS. 13b, c, and d show embodiments of an integrated mirror and wedge element.
Figure 13B:
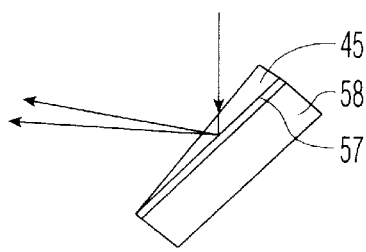
Figure 13C:
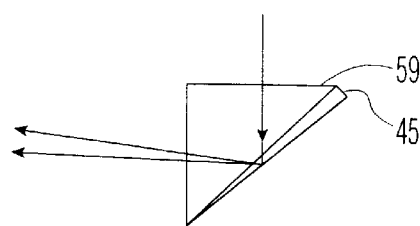
Figure 13D:
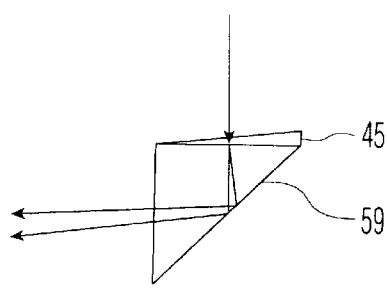

FIG. 13a shows another embodiment of a device for scanning a magneto-optical record carrier provided with a mirror 57 to fold the light path of the device. The mirror may be advantageously integrated with the beam splitter wedge 45. The wedge is mounted with one of its sides on a plane parallel plate 58, whereas the other side of the wedge is provided with a reflection coating 57. FIG. 13b shows an integrated mirror and wedge, with the reflection-coated side of the wedge mounted on a plate. The integrated mirror and wedges shown in FIGS. 13c and 13d use total internal reflection to deflect the light. The wedge 45 may be arranged on the hypotenuse face of a prism 59, as shown in FIG. 13c, or on the face of the prism on which the incoming beam falls, as shown in FIG. 13d.

In addition to its use in a device for scanning a magneto-optical record carrier, the beam splitter according to the invention may alternatively be used in other devices in which a light beam is to be split into different polarizations for determining the state of polarization of the light beam.

It is sometimes desirable to couple out only a small part of the power in the light beam for determining the state of polarization; the power in the on-going light beam can then be used for other purposes. This can be satisfactorily realised by means of a beam splitter according to the invention. If the angle between the directions of orientation of, for example the beam splitter as shown in FIG. 6 is smaller than 45°, the power in the on-going beam 16 is larger than the sum of that of the polarized beams 17, 18. The state of polarization of the light beam can be determined by determining the power in the polarized beams, possibly combined with the power in the ongoing beam. The beam splitter according to the invention has the advantage that only one optical component is to be arranged in the light beam and that any desired ratio of the power of the beams can be easily realised. The device may be a receiver in an optical communication system as described in, for example the review article in the magazine Funkschau vol. 18, 1991, pp. 79–85 in which the information in the light beam is detected by means of heterodyne techniques.

What is claimed is:

1. A method of manufacturing a polarization-sensitive beam splitter comprising at least one transparent wedge-shaped element of a birefringent material, characterized in that two substrate plates are each provided with an orientation layer, whereafter the substrate plates are arranged with their orientation layers facing each other while forming a wedge-shaped interspace, whereafter the interspace is filled with a liquid crystalline monomer composition which is subsequently cured while forming a wedge-shaped element, whereafter, the substrate plates are removed.

2. A method as claimed in claim 1, characterized in that a second transparent wedge-shaped element of a uniaxially oriented polymer material having a different direction of orientation is formed in an analogous manner, whereafter the two wedge-shaped elements are combined by means of an optically neutral glue.

3. A polarization sensitive beam splitter, for separating in transmission the orthogonally polarized components of a light beam, said beam splitter having an entrance surface for the light beam and an exit surface for the orthogonally polarized components of the light beam and comprising at least one, self-supporting, wedge-shaped element of a birefringent, uniaxially oriented, liquid crystalline material, characterized in that the material is a polymer formed from a uniaxially oriented liquid crystalline polymer composition and at least one of the entrance and exit surfaces is provided with an anti-reflection grating.

4. A polarization-sensitive beam splitter as claimed in claim 3, characterized in that the angle between the two directions of orientation of the polymer material in the wedge-shaped elements is larger than 45°.

5. A polarization-sensitive beam splitter as claimed in claim 3, characterized in that the beam splitter comprises two wedge-shaped elements have mutually different directions of orientation of the polymer material.

6. A device for scanning a magneto-optical record carrier comprising a light source for supplying a scanning beam, an optical system for directing the scanning beam onto an information plane of the record carrier, a photosensitive detection system arranged in the path of the scanning beam from the record carrier and a polarization-sensitive beam splitter as claimed in claim 3, arranged in said path before the detection system.

7. A polarization sensitive beam splitter, as claimed in claim 3, characterized in that the beam splitter comprises three wedge-shaped elements arranged one behind the other, the outer two of which have the same direction of orientation of the polymer materials, said direction being different from the direction of orientation of the inner element.

8. A device for scanning a magneto-optical record carrier comprising a light source for supplying a scanning beam, an optical system for directing the scanning beam onto an information plane of the record carrier, a photosensitive detection system arranged in the path of the scanning beam from the record carrier and a polarization-sensitive beam splitter, arranged in said path before the detection system, for separating in transmission the orthogonally polarized components of a light beam, said beam splitter comprising at least one, self-supporting, transparent wedge-shaped element of a birefringent, uniaxially oriented, liquid crystalline material, said material being a polymer formed from a uniaxially oriented, liquid crystalline monomer composition.

9. A device for scanning a magneto-optical record carrier as claimed in claim 8 wherein the beam splitter comprises two wedge-shaped elements, having two mutually different directions of orientation, of the polymer material.

10. A device for scanning a magneto-optical record carrier as claimed in claim 9 wherein the angle between the two mutually different directions of orientation of the polymer material in the wedge-shaped elements is greater than 45°.

11. A device for scanning a magneto-optical record carrier as claimed in claim 8 wherein the beam splitter comprises three wedge-shaped elements arranged one behind the other, the outer two of which have the same direction of orientation for the polymer material, said direction of orientation being different from the direction of orientation of the polymer material of the inner element.

* * * * *